UNITED STATES PATENT OFFICE.

FRANK KOWALSKY, OF NEWARK, NEW JERSEY.

PAINT.

SPECIFICATION forming part of Letters Patent No. 580,409, dated April 13, 1897.

Application filed October 27, 1896. Serial No. 610,185. (No specimens.)

*To all whom it may concern:*

Be it known that I, FRANK KOWALSKY, a citizen of the United States, residing at Newark, in the county of Essex and State of New Jersey, have invented certain new and useful Improvements in Paint; and I do hereby declare the following to be a full, clear, and exact description of the invention, such as will enable others skilled in the art to which it appertains to make and use the same.

This invention relates to a novel composition for a black paint, and is especially adapted for application to articles that are submerged in the water or ground, and which when applied will serve to preserve and protect said articles from the matter in which they are submerged.

The said paint is composed of the following ingredients, which are combined in the proportions stated. The following ingredients are in the proportion used for making twenty-one gallons of the paint, namely: spirits of turpentine, ten gallons; rosin, forty pounds; lampblack, forty pounds; alum, eight pounds; strychnine, three pounds; japan or gold-size, four gallons; and Venetian turpentine, ten pounds.

In making this composition the rosin must be ground fine and cleaned, the lampblack must be thoroughly dry, and the alum should be in a finely-powdered condition, whereby it dissolves more readily. The strychnine should be ground to a powdered mass, while the japan or gold-size should be clear and unmixed with benzin or other fluids of a similar nature, while the Venetian turpentine should be as it is sold for commercial uses.

In making this composition I first take eight gallons of spirits of turpentine, one gallon of japan or gold-size, and forty pounds of rosin and thoroughly commingle the same, and then cook them for thirty minutes. I then take three pounds of strychnine and eight pounds of alum and mix it with sufficient spirits of turpentine to make a mass of thick consistency, which I grind in a mill. This ground mixture of strychnine, alum, and turpentine is then added to the first mixture and the whole is cooked one hour. I then take the forty pounds of lampblack and ten pounds of Venetian turpentine and mix these with the three remaining gallons of japan or gold-size and the remainder of the turpentine, and then, after being thoroughly commingled, this last admixture is added to the formerly-cooked mixture. Then the whole composition is cooked for one hour and thirty minutes. After the compound is thoroughly cooked the residue is ground thoroughly. If this composition is found too thick, it can be easily thinned with japan or gold-size, as found convenient. In cooking the mixture it is preferable to employ a steam-bath. These ingredients are thoroughly commingled, and it is found that by reason of the combination of the different ingredients the paint has a fatty surface and a slow-drying process. It has a strictly black color and a very hard surface that will not blister or black, and, furthermore, dries evenly. The strychnine in the paint effectually destroys insects in the water or ground in which the articles are placed, and thus, while the paint prevents the water or ground from coming into contact with the article, the paint destroys insects that might bore through and into the same. It will be seen, therefore, that a paint of this kind can be used with advantage in a variety of ways, for instance, the roofs of cars, where it would preserve the car for a longer period than usual and effectually exclude dampness.

Having thus described my invention, what I claim as new, and desire to secure by Letters Patent, is—

A paint consisting of spirits of turpentine, rosin, lampblack, alum, strychnine, japan or gold-size, and Venetian turpentine, combined in the manner and proportions specified, substantially as described.

In testimony whereof I have signed this specification in the presence of two subscribing witnesses.

FRANK KOWALSKY.

Witnesses:
 JOSEPH B. PIERSON,
 WM. H. ELLENBERGR.